(12) United States Patent
Akarapu et al.

(10) Patent No.: US 11,952,305 B2
(45) Date of Patent: Apr. 9, 2024

(54) METHODS AND SYSTEMS FOR PROCESSING OPTICAL FIBER

(71) Applicant: CORNING INCORPORATED, Corning, NY (US)

(72) Inventors: Ravindra Kumar Akarapu, Horseheads, NY (US); Joel Patrick Carberry, Big Flats, NY (US); David Alan Deneka, Corning, NY (US); Steven Akin Dunwoody, Castle Hayne, NC (US); Kenneth Edward Hrdina, Horseheads, NY (US); John Michael Jewell, Wilmington, NC (US); Yuanjie Jiang, Painted Post, NY (US); Nikolaos Pantelis Kladias, Horseheads, NY (US); Ming-Jun Li, Horseheads, NY (US); Barada Kanta Nayak, Painted Post, NY (US); Dale Robert Powers, Painted Post, NY (US); Chunfeng Zhou, Painted Post, NY (US); Vincent Matteo Tagliamonti, Painted Post, NY (US); Christopher Scott Thomas, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 110 days.

(21) Appl. No.: 17/490,720

(22) Filed: Sep. 30, 2021

(65) Prior Publication Data

US 2022/0098085 A1 Mar. 31, 2022

Related U.S. Application Data

(60) Provisional application No. 63/085,527, filed on Sep. 30, 2020.

(51) Int. Cl.
*C03B 37/027* (2006.01)
*C03B 37/029* (2006.01)

(52) U.S. Cl.
CPC ...... *C03B 37/02727* (2013.01); *C03B 37/029* (2013.01); *C03B 2205/55* (2013.01); *C03B 2205/56* (2013.01)

(58) Field of Classification Search
None
See application file for complete search history.

(56) References Cited

U.S. PATENT DOCUMENTS

| 3,981,705 A | 9/1976 | Jaeger et al. |
| 4,396,409 A | 8/1983 | Bailey et al. |

(Continued)

FOREIGN PATENT DOCUMENTS

| JP | 60016828 A | * | 1/1985 | ....... C03B 37/02718 |
| JP | 10001318 A | * | 1/1998 | ............... C03B 5/26 |

(Continued)

OTHER PUBLICATIONS

JP-60016828-A EPO Machine Tranlsation Performed Apr. 3, 2023. (Year: 2023).*

(Continued)

*Primary Examiner* — Lisa L Herring
(74) *Attorney, Agent, or Firm* — Yiqun Zhao

(57) ABSTRACT

In some embodiments, a method for processing an optical fiber includes: drawing an optical fiber through a draw furnace, conveying the optical fiber through a flame reheating device downstream from the draw furnace, wherein the flame reheating device comprises one or more burners each comprising: a body having a top surface and an opposing bottom surface, an opening within the body extending from the top surface through the body to the bottom surface, wherein the optical fiber passes through the opening, and (Continued)

one or more gas outlets within the body; and igniting a flammable gas provided by the one or more gas outlets to form a flame encircling the optical fiber passing through the opening, wherein the flame heats the optical fiber by at least 100 degrees Celsius at a heating rate exceeding 10,000 degrees Celsius/second.

15 Claims, 7 Drawing Sheets

(56) References Cited

U.S. PATENT DOCUMENTS

| | | | |
|---|---|---|---|
| 6,010,741 A | | 1/2000 | Rosenkranz et al. |
| 6,092,394 A | * | 7/2000 | Backer .................. G02B 6/2856 65/409 |
| 6,565,775 B2 | | 5/2003 | Dubois et al. |
| 9,309,143 B2 | | 4/2016 | Dunwoody et al. |
| 10,221,089 B2 | | 3/2019 | Bookbinder et al. |
| 2002/0139149 A1 | * | 10/2002 | Shimizu ................ C03B 37/027 65/377 |
| 2003/0101774 A1 | | 6/2003 | Oh et al. |
| 2013/0047676 A1 | | 2/2013 | Chen et al. |
| 2013/0255323 A1 | | 10/2013 | Matsushita |
| 2017/0073265 A1 | * | 3/2017 | Bookbinder ...... C03B 37/02727 |
| 2017/0240456 A1 | | 8/2017 | Akarapu et al. |
| 2018/0093915 A1 | | 4/2018 | Dunwoody et al. |
| 2018/0246274 A1 | | 8/2018 | Billings et al. |
| 2019/0359517 A1 | | 11/2019 | Argaw et al. |

FOREIGN PATENT DOCUMENTS

| | | |
|---|---|---|
| JP | 2011-102964 A | 5/2011 |
| WO | 2019/040858 A1 | 2/2019 |

OTHER PUBLICATIONS

JP-10001318-A Machine Translation Clarivate Analytics Retrieved Apr. 4, 2023. (Year: 2023).*
Keiser, "Optical Fiber Communications", McGraw-Hill Series in Electrical Engineering, copyright 1993, 244 pages. (Year: 1993).*
A.V. Belov, et al, "Drawing of glass-fiber waveguides using CO2 lasers," Sov. J. Quantum Electron. 8(9), 1978, 2 pages.
Charles Lamb "Chapter 9—Relaxation Phenomena", in Structural Chemistry of Glasses, 2002, 39 pages.
Kase, S., et al., "Studies on melt spinning. I. Fundamental equations on the dynamics of melt spinning", J. Polym. Sci. Part A, vol. 3, 1965, pp. 2541-2554.
R. E. Jaeger, "Laser drawing of glass fiber optical waveguides", Am. Cer. Soc. Bull., 55, 270, 1976, 4 pages.
Roger Loucks, "Fictive temperature and glass relaxation", The 3rd Virtual Glass Course—a Cooperative Course Taught by glass experts from US and Germany, 2010, 25 pages.
Tsujikawa, Tajima, et al., "Intrinsic loss of optical fibers", Optical Fiber Technology, vol. 11(4), 2005, pp. 319-331.
Tsujikawa, Tajima, et al., "Rayleigh scattering reduction method for silica-based optical fiber", J. Lightwave Technology, vol. 18 No. 11, 2000, pp. 1528-1532.

* cited by examiner

METHODS AND SYSTEMS FOR PROCESSING OPTICAL FIBER

CROSS-REFERENCE TO RELATED APPLICATIONS

This application claims the benefit of priority under 35 U.S.C. § 119 of U.S. Provisional Application Ser. No. 63/085,527 filed on Sep. 30, 2020, the content of which is relied upon and incorporated herein by reference in its entirety.

BACKGROUND

Field

The present specification generally relates to apparatuses and methods for processing optical fibers, and more particularly, to apparatuses and methods for reheating of an optical fiber in a fiber draw process.

Technical Background

Conventional manufacturing processes for producing optical fibers generally include drawing an optical fiber downward from a draw furnace and along a linear pathway through multiple stages of production in an optical fiber draw tower. Once drawn from the draw furnace, the optical fiber may be cooled in a regulated manner to achieve desired fiber properties.

To meet consumer demand for optical fiber, it is desirable to increase optical fiber production within existing optical fiber draw towers. To increase optical fiber production, the rate at which the optical fiber is drawn is generally increased. However, increased draw rates may lead to increased temperatures of the optical fiber at the various stages of production, which may lead to decreased quality of the optical fiber.

Accordingly, a need exists for improved methods and systems for processing an optical fiber in a draw process.

SUMMARY

A first embodiment of the present disclosure includes a system for processing optical fiber, comprising: a draw furnace containing an optical fiber preform; a fiber conveyance pathway extending between an upstream end of the draw furnace and a downstream end opposite the upstream end, wherein an optical fiber drawn from the optical fiber preform is conveyed along the fiber conveyance pathway from the upstream end to the downstream end in a fiber conveyance direction; and a flame reheating device surrounding the fiber conveyance pathway downstream from the draw furnace, wherein the flame reheating device is configured to heat the optical fiber by at least 100 degrees Celsius at a heating rate greater than 10,000 degrees Celsius/second, wherein the flame reheating device comprises one or more burners each comprising: a body having a top surface and an opposing bottom surface, an opening within the body extending from the top surface through the body to the bottom surface, wherein the opening is configured to pass the optical fiber through the body along the fiber conveyance pathway, and one or more gas outlets within the body configured to ignite a flammable gas to form a flame encircling the optical fiber within the opening.

A second embodiment of the present disclosure includes the system of embodiment 1, wherein the opening comprises an inlet portion and an opposing outlet portion.

A third embodiment of the present disclosure includes the system of embodiment 2, wherein the inlet portion and the outlet portion have a first diameter.

A fourth embodiment of the present disclosure includes the system of embodiment 3, wherein the first diameter is about 0.50 inches to about 5 inches.

A fifth embodiment of the present disclosure includes the system of embodiment 3, wherein the first diameter of the inlet portion and outlet portion decreases to a second diameter proximate a center of the opening.

A sixth embodiment of the present disclosure includes the system of embodiment 5, wherein the second diameter is about 0.11 inches to about 2 inches.

A seventh embodiment of the present disclosure includes the system of embodiment 1-6 wherein the optical fiber is heated by at least 200 degrees Celsius.

A eighth embodiment of the present disclosure includes the system of embodiment 1-7, wherein the optical fiber is heated by at least 500 degrees Celsius.

A ninth embodiment of the present disclosure includes the system of embodiment 1-8, wherein the heating rate of the optical fiber within the flame reheating device is at least 50,000 degrees Celsius/second.

A tenth embodiment of the present disclosure includes the system of embodiment 1-9, wherein the heating rate of the optical fiber within the flame reheating device is at least 20,000 degrees Celsius/second.

A eleventh embodiment of the present disclosure includes the system of embodiment 1-10, wherein the fiber conveyance pathway comprises a slow cooling device downstream of the draw furnace.

A twelfth embodiment of the present disclosure includes the system of embodiment 1-11, wherein the fiber conveyance pathway comprises a turning device downstream of the draw furnace.

A thirteenth embodiment of the present disclosure includes the system of embodiment 1-12, wherein the flame reheating device further comprises a first cooling plate in contact with the top surface of each body and a second cooling plate in contact with the bottom surface of each body, wherein the first cooling plate and the second cooling each comprise an opening extending through the thickness of the cooling plate and lined up with the opening within the body; one or more channels within the cooling plate configured to circulate a cooling fluid; an inlet fluidly coupled to the one or more channels, and an outlet fluidly coupled to the one or more channels.

A fourteenth embodiment of the present disclosure includes the system of embodiment 1-13, wherein the flammable gas is a mix of oxygen and one of methane, ethane, propane, carbon monoxide (CO), or hydrogen.

A fifteenth embodiment of the present disclosure includes the system of embodiment 1-14, wherein fiber conveyance pathway comprises a slow cooling device downstream of the flame reheating device.

A sixteenth embodiment of the present disclosure includes the system of embodiment 1-15, wherein the flame reheating device is configured to heat the optical fiber to a temperature greater than 1100 degrees Celsius.

A seventeenth embodiment of the present disclosure includes the system of embodiment 1-15, wherein the flame reheating device is configured to heat the optical fiber to a temperature greater than 1200 degrees Celsius.

A eighteenth embodiment of the present disclosure includes the system of embodiment 1-15, wherein the flame reheating device is configured to heat the optical fiber to a temperature greater than 1300 degrees Celsius.

A nineteenth embodiment of the present disclosure includes the system of embodiment 1-15, wherein the flame reheating device is configured to heat the optical fiber to a temperature greater than 1400 degrees Celsius.

A twentieth embodiment of the present disclosure includes a method for processing an optical fiber, the method comprising: drawing an optical fiber through a draw furnace, conveying the optical fiber through a flame reheating device downstream from the draw furnace, wherein the flame reheating device comprises one or more burners each comprising: a body having a top surface and an opposing bottom surface, an opening within the body extending from the top surface through the body to the bottom surface, wherein the optical fiber passes through the opening, and one or more gas outlets within the body; and igniting a flammable gas provided by the one or more gas outlets to form a flame encircling the optical fiber passing through the opening, wherein the flame heats the optical fiber by at least 100 degrees Celsius at a heating rate greater than 10,000 degrees Celsius/second.

A twenty-first embodiment of the present disclosure includes the method of embodiment 20, further comprising conveying the fiber along the fiber conveyance pathway at 10 m/s to 80 m/s.

A twenty-second embodiment of the present disclosure includes the method of embodiment 21-21, further comprising providing flammable gas to the reheating device at a flowrate of 2 slpm to 8 slpm per burner.

A twenty-third embodiment of the present disclosure includes the method of embodiment 22, wherein the flammable gas is a mix of oxygen and one of methane, ethane, or propane, carbon monoxide (CO), or hydrogen.

A twenty-fourth embodiment of the present disclosure includes the method of embodiment 20-23, wherein the heating rate of the optical fiber is at least 50,000 degrees Celsius/second.

A twenty-fifth embodiment of the present disclosure includes the method of embodiment claim 20-24, wherein the heating rate of the optical fiber within the flame reheating device is at least 20,000 degrees Celsius/second.

A twenty-sixth embodiment of the present disclosure includes a system for processing an optical fiber, comprising: a draw furnace containing an optical fiber preform; a fiber conveyance pathway extending between an upstream end of the draw furnace and a downstream end opposite the upstream end, wherein an optical fiber drawn from the optical fiber preform is conveyed along the fiber conveyance pathway from the upstream end to the downstream end in a fiber conveyance direction; and a fiber reheating device surrounding the fiber conveyance pathway downstream from the draw furnace, wherein the fiber reheating device is configured to heat the optical fiber from a first temperature at entering the fiber reheating device to a target peak temperature, higher than the first temperature.

A twenty-seventh embodiment of the present disclosure includes the system of embodiment 26, wherein the fiber reheating device is one of a laser device or a flame reheating device, or another reheating device such as a plasma device.

A twenty-eighth embodiment of the present disclosure includes the system of embodiment 27, wherein the laser device is a $CO_2$ laser having a laser power of 100 W to 5 kW.

A twenty-ninth embodiment of the present disclosure includes the system of embodiment 26-28, wherein the draw speed of the optical fiber is 2 m/s to 100 m/s.

A thirtieth embodiment of the present disclosure includes the system of embodiment 26-29, wherein the optical fiber has attenuation of less than 0.002 dB/km at 1310 nm and less than 0.001 dB/km at 1550 nm.

A thirty-first embodiment of the present disclosure includes the system of embodiment 26-30, wherein the first temperature of the optical fiber at entering the fiber reheating device is about 20 degrees Celsius to about 1500 degrees Celsius.

A thirty-second embodiment of the present disclosure includes the system of embodiment claim 26-31, wherein the target peak temperature of the optical fiber within the fiber reheating device is about 900 degrees Celsius to about 1600 degrees Celsius.

A thirty-third embodiment of the present disclosure includes a method for processing an optical fiber, the method comprising: drawing an optical fiber through a draw furnace, conveying the optical fiber through a fiber reheating device downstream from the draw furnace; and heating the optical fiber having a first temperature to a target peak temperature such that a target fictive temperature is obtained in a region of the optical fiber within the fiber reheating device.

A thirty-fourth embodiment of the present disclosure includes the method of embodiment claim 33, wherein the fiber reheating device is one of a flame reheating device or a laser device configured to direct a laser beam toward the optical fiber within the fiber reheating device, or another reheating device such as a plasma device.

A thirty-fifth embodiment of the present disclosure includes the method of embodiment 34, wherein the laser device is a $CO_2$ laser having a laser power of 100 W to 450 W.

A thirty-sixth embodiment of the present disclosure includes the method of embodiment 33-35, wherein the draw speed of the optical fiber is 2 m/s to 100 m/s.

A thirty-seventh embodiment of the present disclosure includes the method of embodiment 33-36, wherein the first temperature of the optical fiber at entering the fiber reheating device is about 20 degrees Celsius to about 1500 degrees Celsius.

A thirty-eighth embodiment of the present disclosure includes the method of embodiment 33-37, wherein the target peak temperature of the optical fiber within the fiber reheating device is about 900 degrees Celsius to about 1600 degrees Celsius.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
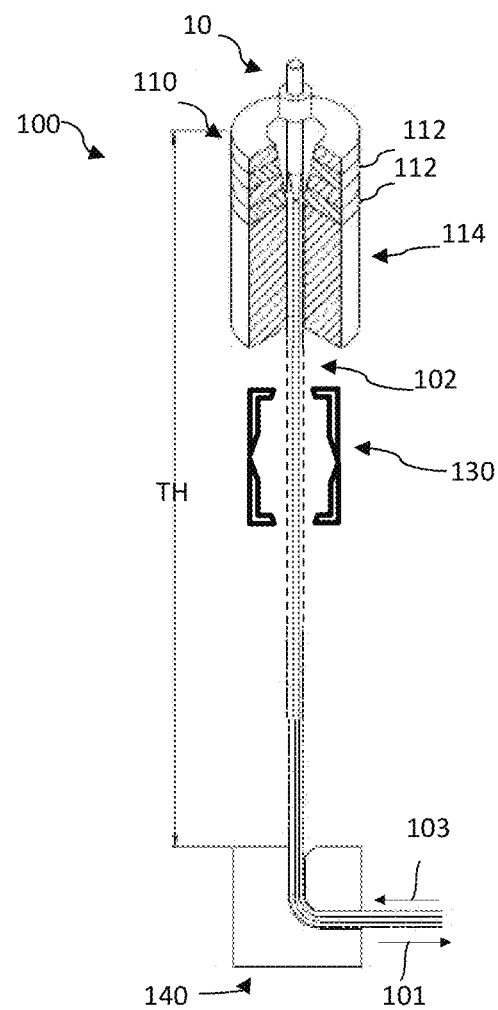
FIG. 1A-1C schematically depicts an optical fiber production system, according to one or more embodiments described herein.

Reference will now be made in detail to illustrative embodiments of the present description. For purposes of the present description, the illustrative embodiments relate to silica-based optical fibers. Silica-based optical fibers include fibers made from pure silica, doped silica, or a combination of pure and doped silica. Processing conditions (e.g. temperatures, cooling ranges, cooling rates, draw speeds, etc.) and properties (e.g. fictive temperature, viscosity, attenuation, refractive index, etc.) are stated in reference to silica-based optical fibers. As those of skill in the art recognize, however, the principles of the present disclosure extend to optical fibers based on other material systems with due consideration for characteristics of the constituents of other material systems (e.g. melting temperature, viscosity, fictive temperature, time scale for structural relaxation etc.).

In conventional fiber processing, a fiber is formed by heating a glass preform above the softening point and drawing the fiber at large draw down ratios to form optical fibers with a desired diameter. For silica glass fibers, the preform diameter can be on the order of about 100 mm to about 120 mm or larger and glass fibers drawn from the preform typically have a diameter of 125 μm. To manufacture silica glass fibers, the silica glass preform is heated to a temperature above 2000° C. and fiber is drawn at speeds of 10 m/s or higher. Due to the high draw temperatures, large draw down ratios and fast draw speeds, the glass structure of silica-based fibers is far from equilibrium and has a fictive temperature higher than 1500° C. Without wishing to be bound by theory, it is believed that the non-equilibrium structure of silica glass fibers is a significant underlying cause of signal attenuation in silica glass fibers. It is accordingly believed that lower attenuation can be achieved in optical fibers by modifying processing conditions to stabilize glass structures and reducing fictive temperature of the glass optical fiber.

For purposes of the present description, fictive temperature will be used as an indicator of glass structure. Glasses with high fictive temperature have structures that are further removed from equilibrium than glasses with low fictive temperature. Processing conditions that lower the fictive temperature of the glass produce optical fibers with lower attenuation.

Processing conditions that extend the period of time in which the fiber is exposed to temperatures in the glass transition region or the near-glass transition region are shown to facilitate relaxation of the structure of the fiber and to reduce the fictive temperature of the fiber. As used herein, glass transition region is a temperature range that includes the glass transition temperature (Tg). In one embodiment, the glass transition region extends from below the glass transition temperature to above the glass transition temperature. The glass transition region generally ranges between 1200° C. and 1700° C. for silica glass optical fibers. There may be additional relaxation of the glass or inducement of the glass toward a more nearly equilibrium state below the glass transition region (near-Tg region), which, for silica-based fibers, corresponds to temperatures between 1000° C. and 1200° C.

Reference will now be made in detail to embodiments of methods and systems for producing optical fibers, examples of which are illustrated in the accompanying drawings. Whenever possible, the same reference numerals will be used throughout the drawings to refer to the same or like parts.

Figure 1B:
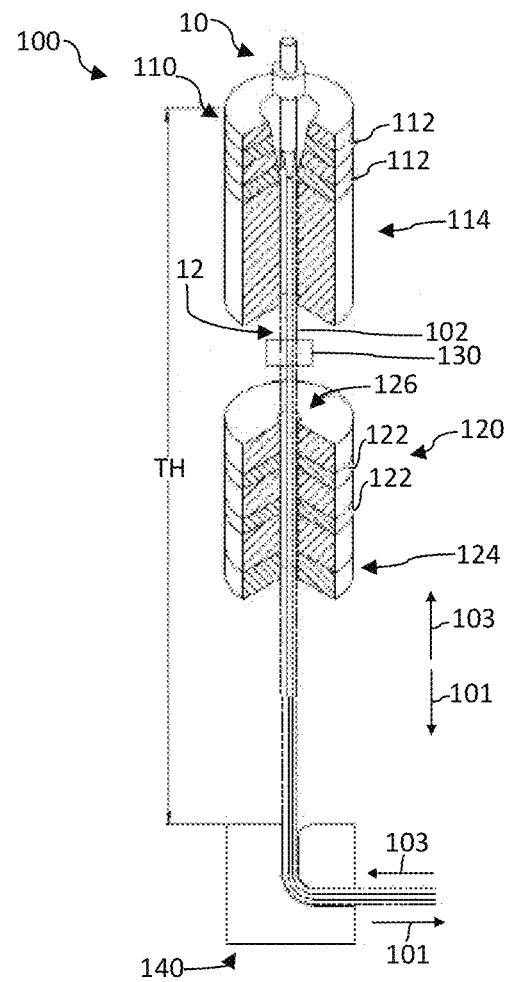
Figure 1C:
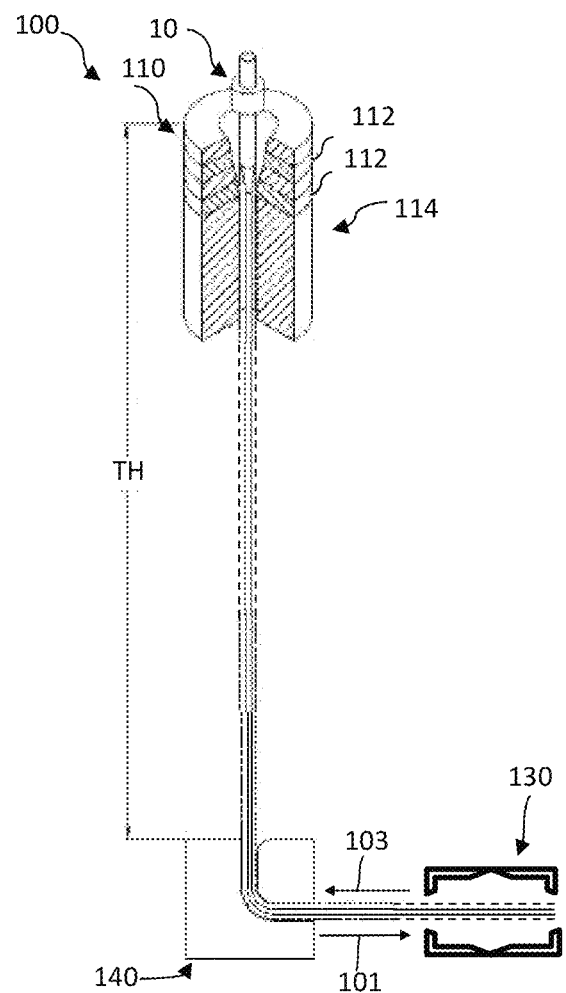

FIG. 1A depicts an exemplary optical fiber production system 100 which generally includes a draw furnace 110, a muffle 114 in communication with the draw furnace 110, a turning device 140, and a reheating device 130 upstream of the turning device 140. FIG. 1B depicts an alternate exemplary optical fiber production system 100 which generally includes a draw furnace 110, a muffle 114 in communication with the draw furnace 110, a reheating device 130 downstream of the draw furnace 110, a slow cooling device 120 downstream of the reheating device 130, and a turning device 140 downstream of the slow cooling device 120. FIG. 1C depicts an alternate exemplary optical fiber production system 100 which generally includes a draw furnace 110, a muffle 114 in communication with the draw furnace 110, a turning device 140 downstream of the draw furnace 110 and a reheating device 130 downstream of the turning device 140. FIG. 1A-1C depict exemplary embodiments of an optical fiber production system 100. Other alternative exemplary embodiments of an optical fiber production system 100 may also be used in accordance with the description herein. For example, an alternate exemplary optical fiber production system 100 includes a draw furnace 110, a muffle 114 in communication with the draw furnace 110, a slow cooling device 120 downstream of the draw furnace 110, a turning device 140 downstream of the slow cooling device 120 and a reheating device 130 downstream of the turning device 140. In another example, an alternate exemplary optical fiber production system 100 includes a draw furnace 110, a muffle 114 in communication with the draw furnace 110, a reheating device 130 downstream of the draw furnace 110, a turning device 140 downstream of the reheating device 130 and a slow cooling device 120 downstream of the turning device 140. In another example, an alternate exemplary optical fiber production system 100 includes a draw furnace 110, a muffle 114 in communication with the draw furnace 110, a reheating device 130 downstream of the draw furnace 110, a first slow cooling device 120 downstream of the reheating device 130, a turning device 140 downstream of the first slow cooling device 120, and a second slow cooling device 120 downstream of the turning device 140. In some embodiments, the reheating device 130 is moveable along the fiber conveyance pathway to adjust the distance between the reheating device and adjacent portions of the optical fiber production system 100. In embodiments, the optical fiber production system 100 may be positioned within a draw tower having a height TH that generally corresponds to a distance between the draw furnace 110 and the turning device 140. In some embodiments, the optical fiber production system 100 may include one or more devices that further process the optical fiber downstream of the turning device 140, such as a fiber coating device and the like.

The optical fiber production system 100 generally defines a fiber conveyance pathway 102 that extends from the draw furnace 110 through the turning device 140. As described in greater detail herein, an optical fiber 12 travels along the fiber conveyance pathway 102 in a fiber conveyance direction 101. As referred to herein, the terms "downstream" and "downward" generally refer to the relative position of components of the optical fiber production system 100 in the fiber conveyance direction 101 along the fiber conveyance pathway 102. The terms "upstream" and "upward" refer to the relative position of components of the optical fiber production system 100 in a counter-conveyance direction 103 that is opposite the fiber conveyance direction 101 along the fiber conveyance pathway 102. By way of example in FIG. 1B, turning device 140 is downstream of cooling device 120, which is downstream of draw furnace 110. Similarly, draw furnace 110 is upstream of cooling device 120, which is upstream of turning device 140. In embodiments, the fiber conveyance pathway 102 generally extends between an upstream end at the draw furnace 110 and a downstream end positioned opposite the upstream end. Between the draw furnace 110 and the turning device 140, the fiber conveyance pathway 102 generally extends in a vertical direction in which the draw furnace 110 is positioned above the turning device 140.

An optical fiber preform 10 is placed in the draw furnace 110. The optical fiber preform 10 may be constructed of any glass or material suitable for the manufacture of optical fibers such as silica glass or the like. In some embodiments, the optical fiber preform 10 may include a homogenous composition throughout the optical fiber preform 10. In some embodiments, the optical fiber preform 10 may include regions having different compositions.

The draw furnace 110 includes one or more heating elements 112 that heat the optical fiber preform 10 such that the optical fiber 12 may be drawn from the optical fiber preform 10. In embodiments, the heating elements 112 generally include any elements suitable for generating thermal energy, for example and without limitation, induction coils or the like. A section view of the draw furnace 110 is depicted in FIGS. 1A and 1B and 1C, however, it should be understood that in embodiments, the draw furnace 110 may define a shape surrounding the optical fiber preform 10. In embodiments, the draw furnace 110 is oriented in the vertical direction, such that a downstream end of the draw furnace 110 is positioned below the optical fiber preform 10. The optical fiber 12 may be drawn from the optical fiber preform 10 as the optical fiber preform 10 softens due to heating by the draw furnace 110. By orienting the draw furnace 110 in the vertical direction, as the optical fiber preform 10 softens, portions of the optical fiber preform 10 may yield under their own weight to form the optical fiber 12, and the optical fiber 12 may be drawn along the fiber conveyance pathway 102. In some embodiments, the optical fiber production system 100 may include a fiber collection unit positioned at the downstream end of the fiber conveyance pathway 102, and the fiber collection unit may apply tension to the optical fiber 12 to draw the optical fiber 12 along the fiber conveyance pathway 102. In embodiments, the optical fiber 12 includes a cladding positioned around a core of the optical fiber 12. In embodiments, the cladding comprises a refractive index that is different than the core of the optical fiber. For example, in embodiments, the core may have a higher refractive index than the cladding, and may assist in restricting light from passing out of the core, for example, when the optical fiber 12 is used as an optical waveguide In embodiments, once the optical fiber 12 exits the draw furnace 110, the optical fiber 12 enters the muffle 114. A section view of the muffle 114 is depicted in FIG. 1A-1C, however like the draw furnace 110, it should be understood that in embodiments, the muffle 114 may define a shape surrounding the fiber conveyance pathway 102. In embodiments, the muffle 114 is in communication with the draw furnace 110 and may be coupled to the downstream end of the draw furnace 110.

In embodiments, the muffle 114 includes a gas environment that is similar to or the same as the draw furnace 110. For example, in some embodiments, an inert gas or gas mixture, such as helium gas or a helium gas mixture is utilized within the draw furnace 110. In some embodiments, other inert gases or other inert gas mixtures including and without limitation, nitrogen and/or argon, may be utilized within the draw furnace 110. The muffle 114 may include the same inert gas environment as the draw furnace 110 within the muffle 114.

Without being bound by theory, helium gas has a relatively high thermal conductivity, and may accordingly facilitate a higher rate of heat transfer from the optical fiber 12 as compared to ambient air or other gas mixtures. Accordingly, in embodiments in which the draw furnace 110 contains a gas environment including helium or a helium mixture, the same helium or helium mixture gas environment within muffle 114 may facilitate comparatively efficient cooling of the optical fiber 12 within the muffle 114.

Downstream from the muffle 14, the optical fiber enters a reheating device 130. The reheating device 130 is configured to heat the optical fiber 10 to a temperature within a glass transformation temperature range of the optical fiber. By rapidly heating the optical fiber temperature to the glass transformation temperature range, the fictive temperature of the optical fiber can be reduced. As a consequence, Rayleigh scattering from the fiber core may also be reduced. In embodiments depicted in FIGS. 1A and 1B, the reheating device 130 is spaced apart from the muffle 114 and the draw furnace 110 along the fiber conveyance pathway 102. Embodiments of the reheating device 130 heat the optical fiber from a first temperature at entering the fiber reheating device to a target peak temperature, which is higher than the first temperature. In some embodiments, the first temperature of the optical fiber at entering the fiber reheating device 130 is about 20 degrees Celsius to about 1500 degrees Celsius, for example about 350 degrees Celsius to 500 degrees Celsius. In some embodiments, the target peak temperature of the optical fiber within the fiber reheating device 130 is about 900 degrees Celsius to about 1600 degrees Celsius, for example about 900 degrees Celsius to about 1400 degrees Celsius. Embodiments of the reheating device 130 described herein heat the optical fiber to a target peak temperature greater than 1100 degrees Celsius, or to a target peak temperature greater than 1200 degrees Celsius, or to a target peak temperature greater than 1250 degrees Celsius, or to a target peak temperature greater than 1300 degrees Celsius, or to a target peak temperature greater than 1400 degrees Celsius. Embodiments of the reheating device 130 described herein heat the optical fiber by at least 100 degrees Celsius, or by at least 200 degrees Celsius, or by at least 500 degrees Celsius. Embodiments of the reheating device 130 described herein heat the optical fiber by 300 degrees Celsius to 1400 degrees Celsius. Embodiments of the reheating device 130 described herein heat the optical fiber at a heating rate of greater than about 10,000 degrees Celsius/second, or at a rate of greater than about 20,000 degrees Celsius/second, or at a rate of greater than about 30,000 degrees Celsius/second, or at a rate of greater than about 40,000 degrees Celsius/second, or at a rate of greater than 50,000 degrees Celsius/second. Embodiments of the reheating device 130 described herein heat the optical fiber at a heating rate of 50,000 degrees Celsius/second to 60,000 degrees Celsius/second. The optical fiber is subsequently cooled from the target peak temperature to a second temperature such that a target fictive temperature is obtained in the optical fiber. In some embodiments, the second temperature of the optical fiber is about 700 degrees Celsius to about 1400 degrees Celsius. In some embodiments, the target fictive temperature of the optical fiber is about 800 degrees Celsius to about 1500 degrees Celsius.

In some embodiments, the reheating device includes directed light source and a light director. As used herein, "light" refers to any wavelength that has practical emission for the disclosed applications and for which absorption in optical fiber glass is non-negligible. In some embodiments, the directed light source can include, for example, a light emitting diode (LED), $CO_2$ laser, CO laser, quantum cascade (QC) laser, pulsed laser, continuous wave laser, or ultraviolet light source. A "directed light source," as used herein, has sufficiently limited divergence that the light can be aimed at optics that steer, shape, focus, or otherwise process the light, or can be aimed at an optical fiber. In some embodiments, for example, the directed light source includes a multi-kilowatt $CO_2$ laser. Furthermore, the directed light source can include other high-brightness light sources operating in ranges of wavelengths that can be absorbed by an optical fiber. Preferably, the light has a wavelength in the range of about 3.5 microns (μm) to about 11 microns. However, the light can also be provided over a wider wavelength range between, for example, about 2 microns and about 16 microns. Furthermore, silica optical fiber absorbs in the ultraviolet, and in some embodiments, an ultraviolet light source is used for directed light. The light director directs the light from the light source to an optical fiber on a fiber draw. "Directing light," as used herein, includes processing the light by steering, shaping, scanning, focusing, defocusing, or otherwise manipulating light from the directed light source to cause the directed light to be incident at an optical fiber. The light director can include a mirror, a beam splitter, a scanning mirror, a flat mirror, curved mirror, parabolic mirror, beam shaping element (e.g., lens), hollow waveguide or any combination thereof. Furthermore, in some embodiments the light director includes multiple lenses, mirrors, or other light directing or beam-shaping elements.

In some embodiments, the reheating device 130 is a flame reheating device. FIG. 2 depicts an exemplary flame reheating device 130 that comprises one or more flame burners, each comprising a body 202. In some embodiments, the flame reheating device 130 has a length of about 10 inches to about 150 inches. The length of the flame reheating device 130 is the distance from the entrance of the first body 202 to the exit of the last body 202 along the fiber conveyance pathway. In some embodiments, the flame reheating device 130 has a length of about 20 inches to about 150 inches, or about 30 inches to about 150 inches, or about 40 inches to about 60 inches, or about 50 inches to about 150 inches.

Figure 2A:
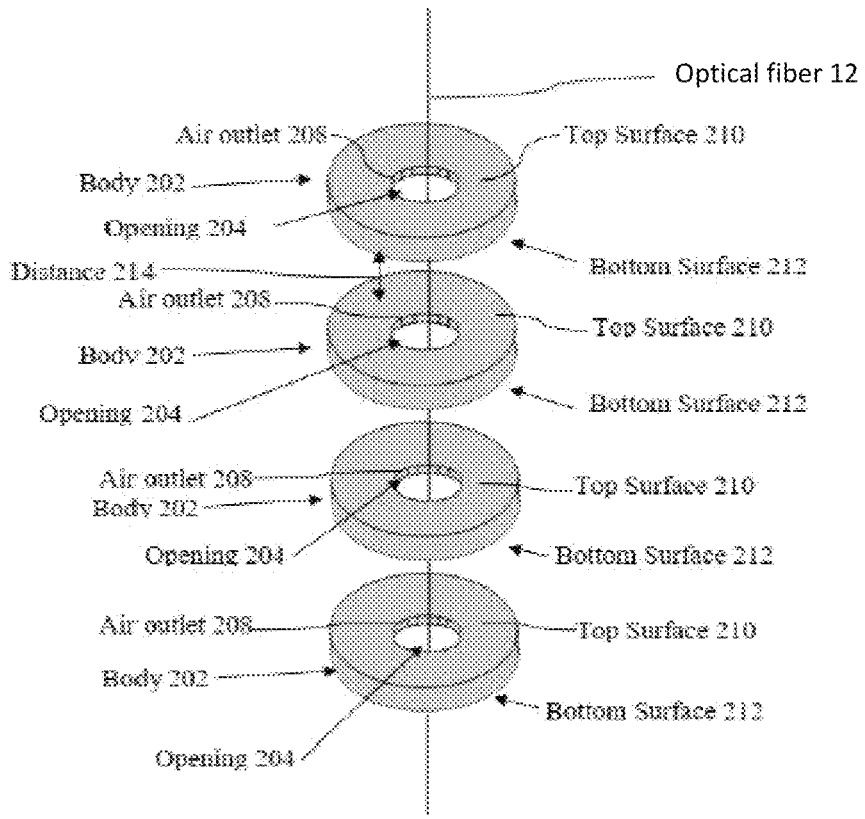
FIG. 2A schematically depicts a reheating device of the optical fiber protection system of FIG. 1, according to one or more embodiments shown and described herein.

In some embodiments, as depicted in FIG. 2, the flame reheating device 130 comprises 4 burners 202. The flame reheating device 130 may contain more or less burners than depicted in the exemplary embodiment, for example 1, 2, 3, 5, 6, or 10, or 15, or 20 burners. Each burner body 202 has a top surface 210 and an opposing bottom surface 212. FIG. 2A depicts the burner body 202 having a circular shape. However the burner body 202 is not limited to a circular shape and may be any other suitable shape (e.g. square, rectangular) that can fit within an optical fiber production system In some embodiments, a distance 214 from a bottom surface 210 of the burner body 202 to a top surface 210 of an adjacent burner body 202 is adjustable to control heat delivery to the optical fiber. For example, in some embodiments, a distance 214 from a bottom surface 210 of the burner body 202 to a top surface 210 of an adjacent burner body 202 is about 2 inches to about 10 inches. In some embodiments, the distance 214 is about 4 inches to about 10 inches, or about 6 inches to about 10 inches, or about 8 inches to about 10 inches. In some embodiments, the distance 214 is about 2 inches to about 8 inches, or about 2 inches to about 6 inches, or about 2 inches to about 4 inches. In some embodiments, the distance 214 is about 4 inches to about 8 inches or about 6 inches to about 8 inches. In some embodiments, each burner is capable of a heating rate of about 1,000 degrees Celsius/second to about 20,000 degrees Celsius/second. In some embodiments, each burner is capable of a heating rate of about 5,000 degrees Celsius/second to about 20,000 degrees Celsius/second. In some embodiments, each burner is capable of a heating rate of about 10,000 degrees Celsius/second to about 20,000 degrees Celsius/second. In some embodiments, each burner is capable of a heating rate of about 15,000 degrees Celsius/second to about 20,000 degrees Celsius/second.

Each body 202 has an opening 204 extending from the top surface 210 through the body 202 to the bottom surface 212. The optical fiber 12 passes through the opening 204. In some embodiments, the opening 204 comprises an inlet portion and an opposing outlet portion. The inlet portion and the outlet portion have a first diameter of about 0.5 inches to about 5 inches. In some embodiments, the first diameter is about 1 inch to about 5 inches. In some embodiments, the first diameter is about 2 inch to about 5 inches. In some embodiments, the first diameter is about 3 inch to about 5 inches. In some embodiments, the first diameter is about 4 inch to about 5 inches. The first diameter of the inlet portion and outlet portion decreases to a second diameter proximate a center of the opening. In some embodiments, the second diameter is about 0.1 inches to about 2 inches. In some embodiments, the second diameter is about 0.5 inches to about 2 inches. In some embodiments, the second diameter is about 1 inch to about 2 inches. In some embodiments, the second diameter is about 0.1 inches to about 1.5 inches. In some embodiments, the second diameter is about 0.1 inches to about 1 inch. In some embodiments, the second diameter is about 0.1 inch to about 0.5 inches Flammable gas from one or more gas outlets 208 within the body 202 is ignited to form a flame encircling the optical fiber 10 passing through the opening 204 to heat the optical fiber 10. In some embodiments, the flammable gas is a mixture of oxygen and one of methane ($CH_4$), ethane ($C_2H_6$), propane ($C_3H_8$), carbon monoxide (CO), or hydrogen. In some embodiments, the ratio of the one of methane, ethane, propane, carbon monoxide (CO), or hydrogen to the oxygen is higher than their stoichiometric ratio.

In some embodiments, the one or more gas outlets 208 are a plurality of nozzles directed toward the optical fiber 10. In some embodiments, the plurality of nozzles is 2 to 50 nozzles, preferably 3 to 20 nozzles, more preferably 3 to 12 nozzles. In some embodiments, each nozzle is positioned equidistant from an adjacent nozzle as measured from a center of one nozzle to a center of an adjacent nozzle. In some embodiments, each of the plurality of nozzles has a diameter of about 100 micron to about 5 mm. In some embodiments, each body 202 provides a volumetric flow rate of flammable gas from about 2 slpm to about 8 slpm.

In some embodiments, the one or more gas outlets 208 is a single slot opening directed toward the optical fiber 10. In some embodiments, the slot opening has a width of about 50 microns to about 2 mm. In some embodiments, the slot opening has a width of about 100 microns to about 2 mm, or about 500 microns to about 2 mm, or about 1 mm to about 2 mm.

Figure 2B:
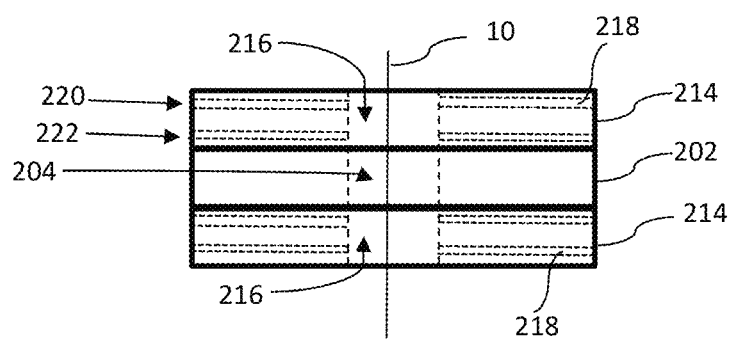
FIG. 2B depicts a reheating device with cooling plates according to one or more embodiments shown and described herein.

In embodiments, the reheating device 130 includes a plurality of cooling plates. Combustion of the flammable gas may result in condensation of water around the burner body 202 and the optical fiber 10. Cooling the burners prevents condensation around the body 202 and the optical fiber 10. FIG. 2B depicts an exemplary embodiment of a burner body 202 having a first cooling plate 214 positioned in contact with a top surface 210 of the body 202 and a second cooling plate 214 positioned in contact with a bottom surface 212 of the body 202. The cooling plate 214 has an opening 216 extending through the thickness of the cooling plate and is lined up with the opening 204 of the body 202 to allow the optical fiber to be conveyed along the fiber conveyance pathway from the upstream end to the downstream end in a fiber conveyance direction. In embodiments, the cooling plate 214 may have the same shape as the body 202. For example, both the cooling plate 214 and the body 202 may have a circular shape. In embodiments, the cooling plate 214 may have a shape that is different from the body 202. For example, the cooling plate may have a rectangular shape and the body 202 may have a circular shape. In embodiments, a cooling plate may be positioned only in contact with a top surface 210 of the body 202. In embodiments, a cooling plate may be positioned only in contact with a bottom surface 212 of the body 202. Each cooling plate 214 has one or more channels 218 within the plate 214 to allow flow of a cooling fluid. In embodiments, the cooling fluid is water. In embodiments, the cooling fluid is water heated, prior to entering the channels 218, to a temperature of greater than or equal to about 50 degrees Celsius, for example about 50 degrees Celsius to about 60 degrees Celsius. Each cooling plate 214 has an inlet 220 and an outlet 222 fluidly coupled to the channel 218 to allow cooling fluid to circulate through the channels 218. In some embodiments, the cooling plate is maintained at a temperature of above 50 degrees Celsius.

Figure 4:
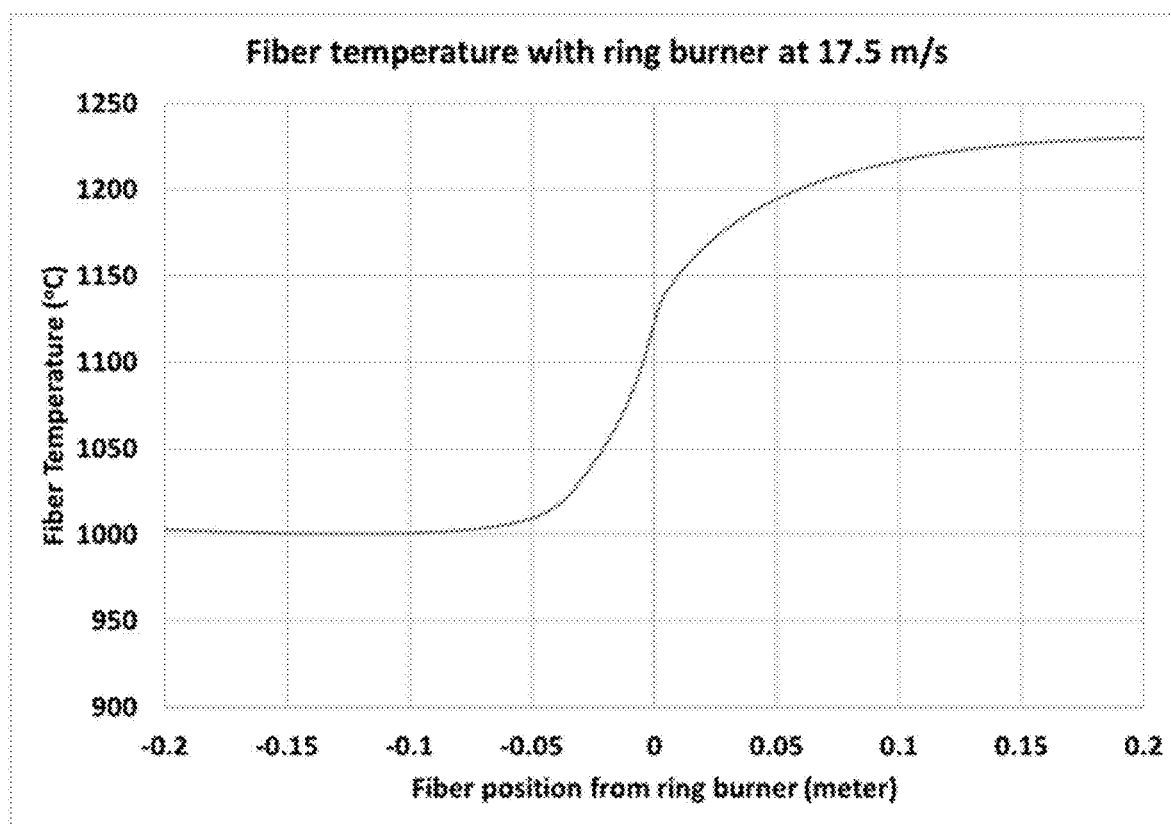
FIG. 4 is a plot of fiber temperature vs fiber position in the reheating device of FIG. 2, according to one or more embodiments described herein.
Figure 5:
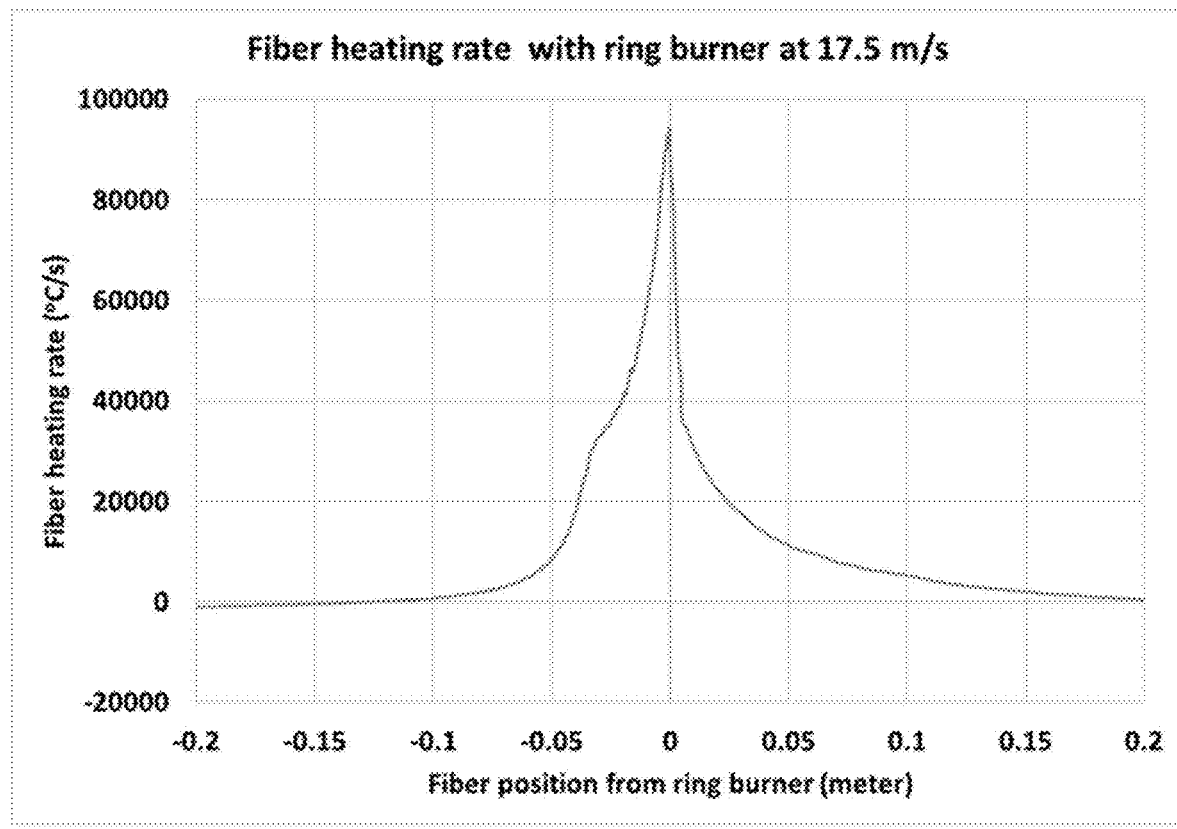
FIG. 5 is a plot of fiber heating rate vs fiber position in the reheating device of FIG. 2, according to one or more embodiments described herein.

FIG. 4 is a plot of fiber temperature vs fiber position in the flame reheating device of FIG. 2, according to one or more embodiments described herein. The plot shows a very sharp increase of temperature very close to the flame reheating device face. The vast majority of the temperature increase is within 4 inches (10 cm) of space near the flame reheating device center plane. FIG. 5 is a plot of fiber heating rate vs fiber position in the flame reheating device of FIG. 2, according to one or more embodiments described herein. The plot shows the fiber heating rate is above 10,000 degrees Celsius/second within about 4-inch of the flame reheating device face. Nearer the flame reheating device face center plane, the heating rate is much higher, above about 80,000 degrees Celsius/second at its peak.

In embodiments as depicted in FIG. 1B, downstream from the reheating device 130, the optical fiber 12 enters a first slow cooling device 120. A section view of the cooling device 120 is depicted in FIG. 1B, however, it should be understood that in embodiments the slow cooling device 120 may define a shape that surrounds the fiber conveyance pathway 102. In the embodiment depicted in FIG. 1B, the slow cooling device 120 is spaced apart from the muffle 114, and the draw furnace 110, and the reheating device 130 along the fiber conveyance pathway 102.

In embodiments, the slow cooling device 120 extends between a second inlet 126 and a second outlet 128 positioned opposite the second inlet 126. The optical fiber 12 generally enters the cooling device 120 at the second inlet 126 and exits the cooling device 120 at the second outlet 128. The cooling device 120 includes one or more cooling device heating elements 122 that apply heat to the optical fiber 12 as it passes through the cooling device 120. In some embodiments, the one or more heating elements 122 generally include any elements suitable for generating thermal energy, for example and without limitation, induction coils or the like. The cooling device 120 may assist in reducing the cooling rate of the optical fiber 12 while the optical fiber 12 is in a glass transition region. Reducing the cooling rate of the optical fiber 12 in the glass transition region may generally assist in allowing the glass network of the optical fiber 12 to rearrange in a manner that reduces attenuation resulting from Rayleigh scattering when the optical fiber 12 is utilized as an optical waveguide.

In some embodiments, the optical fiber production system 100 further includes an airflow manifold 124 that provides clean air (i.e., ambient air not impacted by the fiber production process) to the cooling device 120. The airflow manifold 124 may be positioned downstream of and may be in fluid communication with the cooling device 120.

The turning device 140 is positioned on the fiber conveyance pathway 102 downstream of the cooling device 120, and in embodiments, the turning device 140 changes the fiber conveyance direction 101. For example, in embodiments, the turning device 140 includes one or more fluid bearings or the like that redirects the optical fiber 12, changing the fiber conveyance direction 101. Upstream of the turning device 140, the fiber conveyance direction 101 generally extends in the vertical direction and the turning device 140 directs the optical fiber 12 in a direction that is transverse to or at an angle to the vertical direction in the embodiment depicted in FIG. 1A or 1B or 1C. In the embodiments in which the turning device 140 includes one or more fluid bearings, the turning device 140 redirects the optical fiber 12 by impinging fluid (e.g., nitrogen, argon, helium, air, or the like) on the optical fiber 12.

Figure 3:
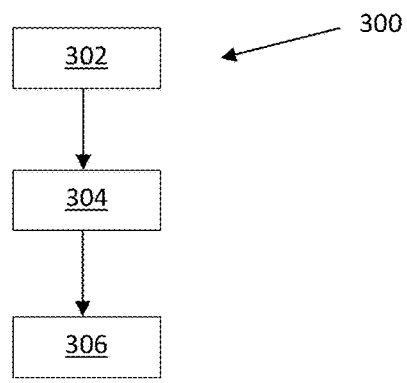
FIG. 3 is a flowchart of a method of cooling optical fiber, according to one or more embodiments described herein.

FIG. 3 is a flowchart of a method of processing optical fiber in an optical fiber processing system having a reheating device 130. The method 300 begins at 302 by drawing an optical fiber through a draw furnace. Embodiments of the optical fiber and the draw furnace are described above. Next at 304, the optical fiber is conveyed through a reheating device 130. In some embodiments, the optical fiber is conveyed through the reheating device 130 at a fiber draw speed of about 2 m/s to 100 m/s, or in some embodiments about 10 m/s to 80 m/s, or in some embodiments of about 50 m/s to 60 m/s. Embodiments of the reheating device 130 used in the method 300 are described above. Embodiments of the flame reheating device 130 used in the method 300 are described above with reference to FIG. 2. The optical fiber enters the reheating device 130 at a first inlet and exits the reheating device 130 at the first outlet. At 306, the optical fiber, having a first temperature, is heated to a target peak temperature such that a target fictive temperature is obtained in a region of the optical fiber within the fiber reheating device. In some embodiments, the first temperature of the optical fiber at entering the fiber reheating device 130 is about 20 degrees Celsius to about 1500 degrees Celsius. In some embodiments, the target peak temperature of the optical fiber within the fiber reheating device is about 900 degrees Celsius to about 1600 degrees Celsius. In some embodiments, the reheated optical fiber has an attenuation of less than 0.002 dB/km at 1310 nm and less than 0.001 dB/km at 1550 nm.

Figure 7:
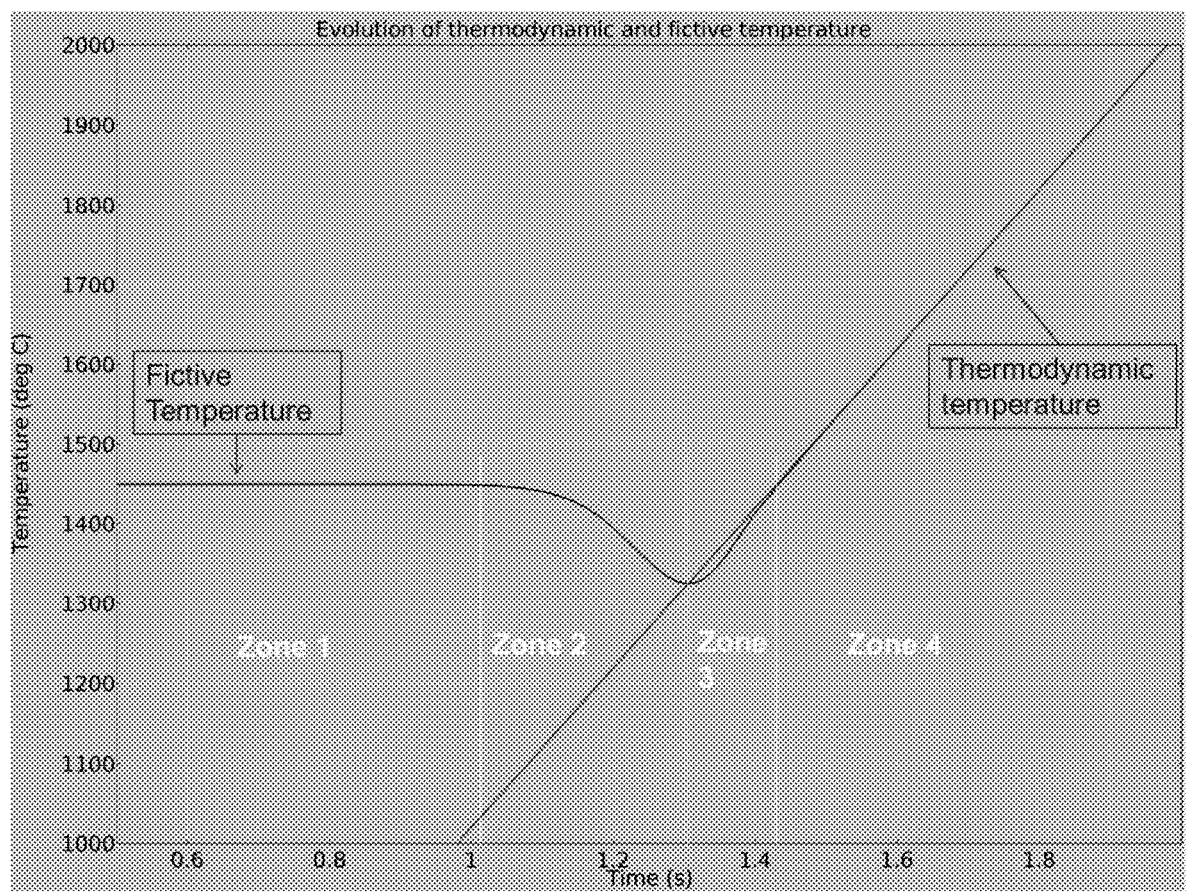
FIG. 7 depicts the thermodynamic temperature change and fictive temperature change of an exemplary optical fiber that is reheated according to one or more embodiments described herein.

One of the challenges in drawing optical fiber is that the glass matrix rapidly cools after forming. This results in a limited envelope of time in which subsequent process steps that require the glass to be above a certain temperature can be performed. Fictive temperature of the fiber core can also be reduced via fiber reheating, which can reduce the Rayleigh scattering related attenuation of optical signals in the finished optical fiber. Rayleigh scattering is responsible for the vast majority of the fiber optical attenuation in the interested wavelength range. The method and apparatus described herein reduce Rayleigh scattering and thereby reduce fiber optical attenuation. FIG. 7 depicts the thermodynamic temperature change and fictive temperature change of an exemplary germanium (Ge) doped silica fiber that is heated at a rate of 10,000° K/s. The thermodynamic temperature change and fictive temperature change is divided into four zones. In Zone 1, the thermodynamic temperature of the optical fiber is lower than the fictive temperature, but the thermodynamic temperature is too low to change the fictive temperature. In Zone 2, the thermodynamic temperature of the optical fiber is lower than its fictive temperature, but it is hot enough to enable a decrease in the fictive temperature. In Zone 3, the thermodynamic temperature of the optical fiber is higher than its fictive temperature. In Zone 4, the fictive temperature and the thermodynamic temperatures of the optical fiber are equal to each other with the fictive temperature greater than initial fictive temperature. If the fiber was heated up to Zones 2 or 3, and then suddenly quenched as the fiber leaves the reheating area (i.e. leaves the laser spot in a laser reheating device or leaves the flame zone in a flame reheating device), the fictive temperature would be locked to a lower value than the initial fictive temperature. However, if the fiber temperature is allowed to rise to a very high temperature Zone 4, and suddenly quenched, the fiber loss could go up due to result of higher fictive temperature.

Figure 6:
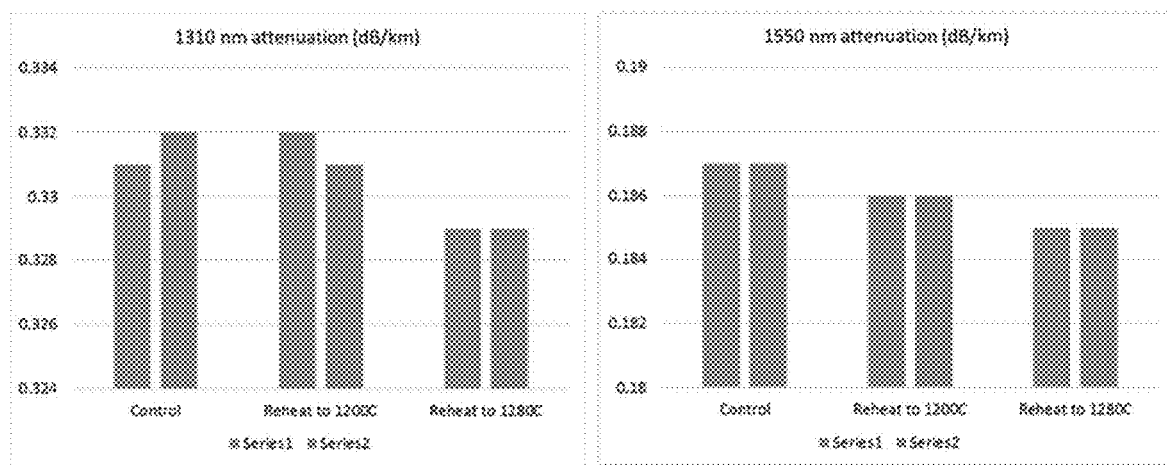
FIG. 6 is a plot of experimental fiber attenuation data according to one or more embodiments described herein.

FIG. 6 plots experimental fiber attenuation data of an optical fiber after reheating. FIG. 6 depicts attenuation at 1310 nm and at 1550 nm for a control optical fiber (no reheating), a first optical fiber reheated to 1200 degrees Celsius and a second optical fiber reheated to 1280 degrees Celsius. When optical fiber was reheated to 1250 C or above, an attenuation reduction is shown via reheating of the fiber.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A system for processing optical fiber, comprising:
an optical fiber preform;
a draw furnace containing the optical fiber preform;
a fiber conveyance pathway extending between an upstream end of the draw furnace and a downstream end opposite the upstream end;
an optical fiber drawn from the optical fiber preform and conveyed along the fiber conveyance pathway from the upstream end to the downstream end in a fiber conveyance direction; and
a flame reheating device surrounding the fiber conveyance pathway downstream from the draw furnace and heating the optical fiber by at least 100 degrees Celsius at a heating rate greater than 10,000 degrees Celsius/second, wherein the flame reheating device comprises a plurality of burners arranged in a successive manner, wherein each of the plurality of burners comprises:
a body having a top surface and an opposing bottom surface,
an opening within the body extending from the top surface through the body to the bottom surface, wherein the opening is configured to pass the optical fiber through the body along the fiber conveyance pathway, and
one or more gas outlets within the body configured to ignite a flammable gas to form a flame encircling the optical fiber within the opening,
wherein a distance between two adjacent burners of the plurality of burners ranges from about 2 inches to about 10 inches.

2. The system of claim 1, wherein the opening of at least one burner of the plurality of burners comprises an inlet portion and an opposing outlet portion.

3. The system of claim 2, wherein the inlet portion and the outlet portion have a first diameter.

4. The system of claim 3, wherein the first diameter of the inlet portion and outlet portion is about 0.50 inches to about 5 inches.

5. The system of claim 3, wherein the first diameter of the inlet portion and outlet portion decreases to a second diameter proximate a center of the opening.

6. The system of claim 5, wherein the second diameter of the inlet and outlet portion is about 0.11 inches to about 2 inches.

7. The system of claim 1, further comprising a slow cooling device downstream of the draw furnace.

8. The system of claim 1, wherein the flame reheating device further comprises a first cooling plate in contact with the top surface of the body of at least one burner of the plurality of burners and a second cooling plate in contact with the bottom surface of the body of the at least one burner of the plurality of burners, wherein the first cooling plate and the second cooling plate each comprise an opening extending through the thickness of the respective first or second cooling plate and lined up with the opening within the body of the at least one burner of the plurality of burners; one or more channels within at least one of the first cooling plate or the second cooling plate configured to circulate a cooling fluid; an inlet fluidly coupled to the one or more channels, and an outlet fluidly coupled to the one or more channels.

9. The system of claim 1, further comprising a slow cooling device downstream of the flame reheating device.

10. The system of claim 1, wherein the flame reheating device is configured to heat the optical fiber to a temperature greater than 1100 degrees Celsius.

11. The system of claim 1, wherein a draw speed of the optical fiber is 2 m/s to 100 m/s.

12. The system of claim 1, wherein a temperature of the optical fiber at entering the flame reheating device is about 20 degrees Celsius to about 1500 degrees Celsius.

13. The system of claim 1, wherein a target peak temperature of the optical fiber within the flame reheating device is about 900 degrees Celsius to about 1600 degrees Celsius.

14. The system of claim 1, wherein the distance between two adjacent burners of the plurality of burners is adjustable.

15. The system of claim 1, wherein the flame reheating device has a length extending through the bodies of the plurality of burners and ranging from about 10 inches to about 150 inches.

* * * * *